(12) United States Patent
Sanders et al.

(10) Patent No.: US 10,855,708 B1
(45) Date of Patent: *Dec. 1, 2020

(54) SYMPTOM DETECTION USING BEHAVIOR PROBABILITY DENSITY, NETWORK MONITORING OF MULTIPLE OBSERVATION VALUE TYPES, AND NETWORK MONITORING USING ORTHOGONAL PROFILING DIMENSIONS

(71) Applicant: Virtual Instruments Worldwide, Inc., San Jose, CA (US)

(72) Inventors: Derek Sanders, Saratoga, CA (US); Rangaswamy Jagannathan, Sunnyvale, CA (US); Rosanna Lee, Palo Alto, CA (US); Kishor Kakatkar, Kothrud (IN); Xiaohong Pan, Fremont, CA (US)

(73) Assignee: Virtual Instruments Worldwide, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/946,092

(22) Filed: Apr. 5, 2018

Related U.S. Application Data

(63) Continuation of application No. 12/180,437, filed on Jul. 25, 2008, now Pat. No. 9,961,094.

(Continued)

(51) Int. Cl.
*G06F 15/173* (2006.01)
*H04L 29/06* (2006.01)
*H04L 29/08* (2006.01)

(52) U.S. Cl.
CPC .......... *H04L 63/1425* (2013.01); *H04L 67/22* (2013.01); *H04L 63/1408* (2013.01); *H04L 67/306* (2013.01)

(58) Field of Classification Search
None
See application file for complete search history.

(56) References Cited

U.S. PATENT DOCUMENTS

| | | | | |
|---|---|---|---|---|
| 5,974,457 | A | * | 10/1999 | Waclawsky ........... H04L 41/142 706/46 |
| 6,697,802 | B2 | | 2/2004 | Ma et al. |

(Continued)

*Primary Examiner* — Mohamed Ibrahim
(74) *Attorney, Agent, or Firm* — Ahmann Kloke LLP

(57) ABSTRACT

One network monitoring system maintains both information regarding historical activity and emergent activity of the network. Comparison of recent activity of the network with historical activity allows the system to determine whether recent network activity is within the realm of normal. The system maintains data structures representing a p.d.f. for observable values of network parameters. Such data structures are maintained both for historical and for emergent activity of the network. Recent activity can be compared with the p.d.f. for historical activity to aid in determining whether that recent activity is within the realm of normal. Network activity not within the realm of normal can include values of observable network parameters too high or too low to be consistent with historical activity of the network, or other values too unlikely to be consistent with historical activity at the network.

Another network monitoring device includes data structures for maintaining information regarding historical activity of a network and emergent activity of a network. Those data structures include multiple types of observable values as well as multiple types of combinations of multiple observable values. The network monitoring device maintains those data structures including information regarding historical activity of a network and emergent activity of a network only for those source/destination pairs, and only for those nodes, for which maintaining that information would be substantially meaningful.

(Continued)

Yet another network monitoring system includes data structures for maintaining information regarding historical activity of a network and emergent activity of a network. Those data structures include observable values for multiple profile dimensions, including source/destination address, application, location, and time. The data structures also include observable values for combinations of more than one of those multiple profile dimensions, including, e.g., (source address)×(application), and the like. It is expected that only a relatively sparse set of combinations of more than one of those multiple profile dimensions would have meaningful information associated therewith. The network monitoring system maintains those data structures only for those combinations of more than one of those multiple profile dimensions for which maintaining that information would be substantially meaningful.

20 Claims, 1 Drawing Sheet

Related U.S. Application Data

(60) Provisional application No. 60/963,229, filed on Aug. 3, 2007, provisional application No. 60/963,234, filed on Aug. 3, 2007, provisional application No. 60/963,233, filed on Aug. 3, 2007, provisional application No. 60/963,227, filed on Aug. 3, 2007, provisional application No. 60/963,226, filed on Aug. 3, 2007, provisional application No. 60/963,228, filed on Aug. 3, 2007, provisional application No. 60/962,295, filed on Jul. 25, 2007, provisional application No. 60/962,182, filed on Jul. 25, 2007, provisional application No. 60/962,181, filed on Jul. 25, 2007.

(56) References Cited

U.S. PATENT DOCUMENTS

| | | |
|---|---|---|
| 6,779,030 B1 | 8/2004 | Dugan et al. |
| 7,076,547 B1 | 7/2006 | Black |
| 7,376,969 B1 | 5/2008 | Njamenze et al. |
| 7,702,563 B2 | 4/2010 | Balson et al. |
| 7,891,000 B1 * | 2/2011 | Rangamani ........... G06F 21/552 709/224 |
| 7,895,320 B1 | 2/2011 | Oggerino et al. |
| 9,716,638 B1 | 7/2017 | Sanders et al. |
| 10,009,237 B1 | 1/2018 | Sanders et al. |
| 9,935,858 B1 | 4/2018 | Sanders et al. |
| 2002/0152284 A1 | 10/2002 | Cambray et al. |
| 2003/0229485 A1 | 12/2003 | Nishikawa et al. |
| 2004/0010718 A1 * | 1/2004 | Porras ................... H04L 41/142 726/23 |
| 2004/0064293 A1 | 4/2004 | Hamilton et al. |
| 2004/0064731 A1 * | 4/2004 | Nguyen ................ H04L 41/046 726/22 |
| 2004/0111358 A1 | 6/2004 | Lange et al. |
| 2004/0117769 A1 | 6/2004 | Lauzon et al. |
| 2005/0213504 A1 | 9/2005 | Enomoto et al. |
| 2005/0276230 A1 | 12/2005 | Akahane et al. |
| 2006/0077905 A1 | 4/2006 | Russell et al. |
| 2006/0077981 A1 | 4/2006 | Rogers |
| 2006/0092841 A1 * | 5/2006 | Lloyd .................... H04L 43/00 370/231 |
| 2007/0014248 A1 | 1/2007 | Fowlow |
| 2007/0019557 A1 | 1/2007 | Catter et al. |
| 2007/0237079 A1 | 10/2007 | Whitehead |
| 2007/0245051 A1 | 10/2007 | Raisoni et al. |
| 2007/0248029 A1 | 10/2007 | Merkey et al. |
| 2007/0271374 A1 | 11/2007 | Shomura et al. |
| 2008/0046104 A1 | 2/2008 | Van Camp et al. |
| 2008/0049628 A1 | 2/2008 | Bugenhagen |
| 2008/0219267 A1 | 9/2008 | Xia et al. |
| 2010/0309812 A1 | 12/2010 | Galan Marquez et al. |
| 2011/0060831 A1 | 3/2011 | Ishii et al. |

* cited by examiner

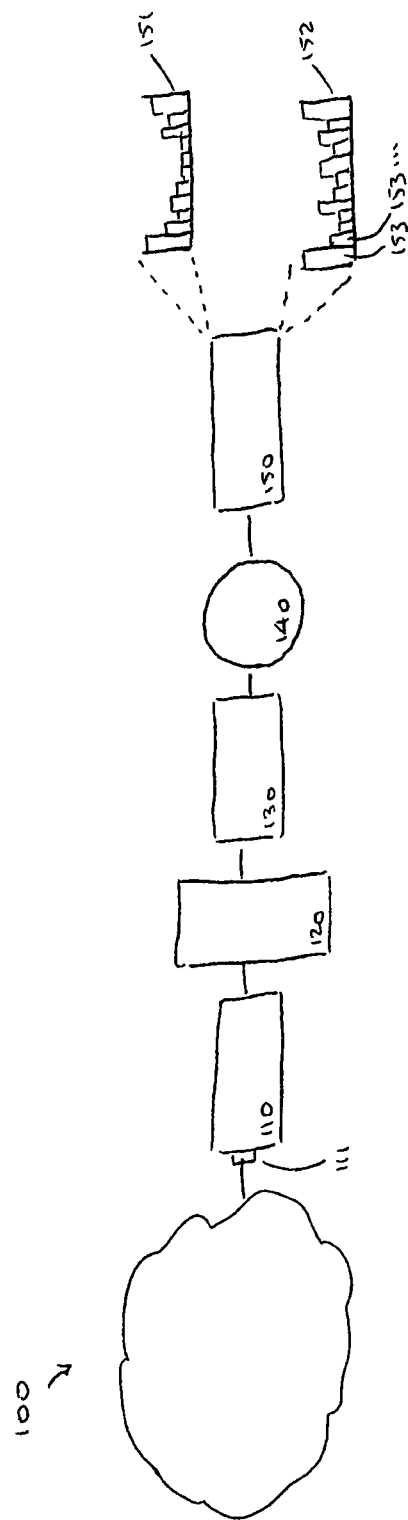

SYMPTOM DETECTION USING BEHAVIOR PROBABILITY DENSITY, NETWORK MONITORING OF MULTIPLE OBSERVATION VALUE TYPES, AND NETWORK MONITORING USING ORTHOGONAL PROFILING DIMENSIONS

CROSS-REFERENCE TO RELATED DOCUMENTS

This case is a continuation of, and claims priority of, the following document:

"U.S. application Ser. No. 12/180,437, filed Jul. 25, 2008, in the name of inventors Derek Sanders et al., titled "Network monitoring using behavior probability density, network monitoring of multiple value types, and network monitoring using orthogonal profiling dimensions", assigned to the same assignee."

This application claims priority of, the following related documents:

U.S. Provisional Patent Application 60/962,181, filed Jul. 25, 2007 in the name of the same inventors, titled "Parallel Distributed Network Monitoring", Express Mail mailing number EV 875 991 898 US.

U.S. Provisional Patent Application 60/962,295, filed Jul. 25, 2007 in the name of the same inventors, titled "Network Monitoring Using Virtual Packets", Express Mail mailing number EV 875 991 884 US.

U.S. Provisional Patent Application 60/962,182, filed Jul. 25, 2007 in the name of the same inventors, titled "Network Monitoring Using Bounded Memory Data Structures", Express Mail mailing number EV 875 991 875 US.

U.S. Provisional Patent Application 60/963,233, filed this same day in the name of the same inventors, titled "Network Monitoring of Behavior Probability Density", Express Mail mailing number EV 875 991 972 US.

U.S. Provisional Patent Application 60/963,234, filed this same day in the name of the same inventors, titled "Symptom Detection Using Behavior Probability Density", Express Mail mailing number EV 875 991 986 US.

U.S. Provisional Patent Application 60/963,229, filed this same day in the name of the same inventors, titled "Continuous Adaptive Monitoring of Network Behavior", Express Mail mailing number EV 875 991 990 US.

U.S. Provisional Patent Application 60/963,226, filed this same day in the name of the same inventors, titled "Spectral Analysis of Periodicity in Network Behavior", Express Mail mailing number EV 875 992 006 US.

U.S. Provisional Patent Application 60/963,228, filed this same day in the name of the same inventors, titled "Network Monitoring of Multiple Observation Value Types", Express Mail mailing number EV 875 992 010 US.

U.S. Provisional Patent Application 60/963,227, filed this same day in the name of the same inventors, titled "Network Monitoring Using Orthogonal Profiling Dimensions", Express Mail mailing number EV 875 992 023 US.

Each of these documents is hereby incorporated by reference as if fully set forth herein. These documents are sometimes referred to herein as the "incorporated disclosures".

BACKGROUND

One known problem when monitoring network activity is that of distinguishing between normal network activity and abnormal network activity. Short-term network activity might represent abnormal activity, might represent a change in normal network activity, or might represent a short-term deviation from normal activity that is itself not problematic. This has the effect that it might become difficult for a network monitoring device to reliably distinguish between those types of network activity that are normal and those types of network activity that are not.

Another known problem is when monitoring network traffic for a relatively large network, the amount of information relating to that network traffic can also be relatively large, with the effect that it might become difficult for a network monitoring device to maintain all of that relatively large amount of information within a reasonable amount of accessible memory.

SUMMARY OF THE DESCRIPTION

In one aspect, a network monitoring system maintains both (1) information regarding historical activity of a network, e.g., in response to a relatively long-term review of network behavior, and (2) information regarding emergent activity of the network, e.g., in response to a relatively short-term review of network behavior. Comparison of recent activity of the network with historical activity of the network allows the network monitoring system to determine whether recent activity of the network is within the realm of normal.

In one embodiment of this aspect, the network monitoring system maintains data structures representing a p.d.f. (probability density function) for observable values of network parameters. Such data structures are maintained both for historical activity of the network and for emergent activity of the network. Recent activity of the network can be compared with the p.d.f. for historical activity to aid in determining whether that recent activity is within the realm of normal. Network activity that is not within the realm of normal can include extreme values of observable network parameters, either too high or too low to be consistent with historical activity of the network, or other values of observable network parameters that are too unlikely to be consistent with historical activity at the network.

In another aspect, a network monitoring device includes data structures for maintaining information regarding historical activity of a network and emergent activity of a network. Those data structures include multiple types of observable values as well as multiple types of combinations of multiple observable values. The network monitoring device maintains those data structures including information regarding historical activity of a network and emergent activity of a network only for those source/destination pairs, and only for those nodes, for which maintaining that information would be substantially meaningful.

In yet another aspect, a network monitoring system includes data structures for maintaining information regarding historical activity of a network and emergent activity of a network. Those data structures include observable values for multiple profile dimensions, including source/destination address, application, location, and time. The data structures also include observable values for combinations of more than one of those multiple profile dimensions, including, e.g., (source address)×(application), and the like.

In one embodiment of this aspect, it is expected that only a relatively sparse set of combinations of more than one of those multiple profile dimensions would have meaningful information associated therewith. The network monitoring system maintains those data structures only for those combinations of more than one of those multiple profile dimensions for which maintaining that information would be substantially meaningful.

DESCRIPTION

Nature of the Description

Read this application in its most general form. This includes, without limitation:
- References to specific structures or techniques include alternative or more general structures or techniques, especially when discussing aspects of the invention, or how the invention might be made or used.
- References to "preferred" structures or techniques generally mean that the inventor contemplates using those structures are techniques, and think they are best for the intended application. This does not exclude other structures or techniques for the invention, and does not mean that the preferred structures or techniques would necessarily be preferred in all circumstances.
- References to first contemplated causes or effects for some implementations do not preclude other causes or effects that might occur in other implementations, even if completely contrary, where circumstances would indicate that the first contemplated causes or effects would not be as determinative of the structures or techniques to be selected for actual use.
- References to first reasons for using particular structures or techniques do not preclude other reasons or other structures or techniques, even if completely contrary, where circumstances would indicate that the first structures or techniques are not as compelling. The invention includes those other reasons or other structures or techniques, especially where circumstances would indicate they would achieve the same effect or purpose as the first reasons, structures, or techniques.

TERMS AND PHRASES

Read this application with the following terms and phrases in their most general form. The general meaning of each of these terms or phrases is illustrative, not in any way limiting.
- The phrase "network monitoring system", and the like, generally refers to any apparatus or method by which information relating to network traffic is identified or reported. The phrase "network monitoring device", and the like, generally refers to any apparatus included in a network monitoring system.
- The phrases "network activity", "network behavior", and the like, generally refer to any information relating to status of a network of processing devices. The phrase "network traffic", and the like, generally refers to any information relating to communication in a network of processing devices.
- The phrase "historical activity", and the like, generally refers to any information responsive to a relatively long-term review of network activity.
- The phrase "emergent activity", and the like, generally refers to any information responsive to a relatively short-term review of network activity.
- The phrase "recent activity", and the like, generally refers to any information responsive to a relatively recent review of network activity.
- The terms "p.d.f." and "probability density function", and the like, generally refer to any information relating to an observed or observable distribution of possible network behavior.

FIGURES AND TEXT

A FIG. 1 shows a block diagram of a system.

FIRST ASPECT

A network monitoring system 100 includes elements as shown in the FIG. 1, including at least: a flow processing engine 110 (coupled to a communication network), a network information buffer 120, a monitoring engine 130, a virtual bus 140, and a database server 150.

The communication network might include any form of communication pathway, such as, a broadcast or narrowcast network, a bus or crossbar switch or other substantially internal communications path in a computing device, a LAN or WAN, a set of external devices disposed for cluster computing or other distributed computing, an enterprise network or internet or intranet, or otherwise.

The flow processing engine 110 includes an input port 111, coupled to the communication network, capable of receiving information from the network regarding communication flows within that network. Such information regarding communication flows might be received from one or more network routers or other traffic reporting devices, as further described in the incorporated disclosures. While this description includes embodiments in which the flow processing engine 110 receives information regarding communication flows, in the context of the invention, there is no particular requirement to so limit the flow processing engine 110 or the invention. For example, the network monitoring system 100 might alternatively operate using information regarding actual network packet traffic, or other information suitable for the operations described herein.

The network information buffer 120 is coupled to an output of the flow processing engine 110, and is capable of receiving network information relating to activity of the communication network. In one embodiment, that network information includes a set of virtual packets, as further described in the incorporated disclosures. While this description includes embodiments in which the network information buffer 120 receives a set of virtual packets, in the context of the invention, there is no particular requirement to so limit the network information buffer 120 or the invention. For example, the network monitoring system 100 might alternatively operate using other information suitable for the operations described herein.

The monitoring engine 130 reads information from the network information buffer 120 and determines substantially instantaneous values for observable values of network parameters.

In one embodiment, these observable values include a bit rate (expressed in bits per second, or an equivalent thereof), a packet rate (expressed in packets per second, or an equivalent thereof), a communication density (expressed as number of concurrent communication partners, or an equivalent thereof), and a communication burstiness (expressed as a change in bit rate, or an equivalent thereof). While this description includes embodiments with regard to these particular observable parameters, in the context of the invention, there is no particular requirement to so limit the monitoring engine 130 or the invention. For example, the network monitoring system 100 might alternatively operate using a first or second derivative of any of these parameters, or other information suitable for the operations described herein.

The virtual bus 140 provides for communication among elements of the network monitoring system 100, such as elements shown in the FIG. 1, including at least: the monitoring engine 130 and the database server 150. Such communication might be conducted using a set of subscription channels, as further described in the incorporated disclosures. While this description includes embodiments in which communication uses subscription channels, in the context of the invention, there is no particular requirement to so limit the virtual bus 140 or the invention. For example, the network monitoring system 100 might alternatively operate using a blackboard communication system, interprocess communication, or other techniques suitable for the operations described herein.

The database server 150 maintains a database of information for use by elements of the network monitoring system 100. The database server 150 includes elements as shown in the FIG. 1, including at least: an historical histogram 151 regarding historical activity of the network, an emergent histogram 152 regarding emergent activity of the network.

The historical histogram 151 and the emergent histogram 152 each include a set of buckets 153, disposed in a sequential order for observable values of a parameter relating to network activity. For example, where that parameter includes a bit rate, the set of buckets 153 might include
a $1^{st}$ bucket 153 for less than $10^1$ bits per second,
a $2^{nd}$ bucket 153 for at least $10^1$ bits per second but less than $10^2$ bits per second,
a $3^{rd}$ bucket 153 for at least $10^2$ bits per second but less than $10^3$ bits per second,
a $4^{th}$ bucket 153 for at least $10^3$ bits per second but less than $10^4$ bits per second,
a $5^{th}$ bucket 153 for at least $10^4$ bits per second but less than $10^5$ bits per second,
a $6^{th}$ bucket 153 for at least $10^5$ bits per second but less than $10^6$ bits per second,
a $7^{th}$ bucket 153 for at least $10^6$ bits per second but less than $10^7$ bits per second, and
an $8^{th}$ bucket 153 for at least $10^7$ bits per second.

While this description includes embodiments in which there are this particular number of buckets and in which the buckets are have an exponentially distributed size, in the context of the invention, there is no particular requirement that buckets 153 or the invention should be so limited. For example, the network monitoring system 100 might alternatively operate using a different number of buckets 153, a Gaussian or other distinct distribution of sizes for those buckets 153, a different set of data for those buckets 153, or other information suitable for the operations described herein.

In each bucket 153, the database server 150 maintains a count of an observed set of values as reported by the monitoring engine 130. This has the effect that the historical histogram 151 and the emergent histogram 152 each represent observed activity of the network, with more frequent activity being represented by buckets 153 having a larger count of their respective observed set of values and with less frequent activity being represented by buckets 153 having a smaller count of their respective observed set of values. This has the effect that the historical histogram 151 and the emergent histogram 152 each represent a p.d.f. (probability distribution function) of network activity.

While this description includes embodiments in which the historical histogram 151 and the emergent histogram 152 each represent a p.d.f. (probability distribution function) of network activity, in the context of the invention, there is no particular requirement that the historical histogram 151 and the emergent histogram 152, or the invention, should be so limited. For example, the network monitoring system 100 might alternatively operate using a histogram representing other information, such as for example a cumulative probably distribution function, or other information suitable for the operations described herein.

The historical histogram 151 represents observed historical activity of the network, i.e., information responsive to a relatively long-term review of network activity. The emergent histogram 152 represents observed emergent activity of the network, i.e. information responsive to a relatively short-term review of network activity. This has the effect that recent activity will first be reflected in the emergent histogram 152, and only later be reflected in the historical histogram 151. Accordingly, from time to time, the historical histogram 151 is adjusted to reflect changes in the emergent histogram 152.

This has the effect that, so long as the emergent histogram 152 is consistent with the historical histogram 151, new changes need be made to the historical histogram 151. In contrast, when the emergent histogram 152 becomes inconsistent with the historical histogram 151, those inconsistencies between the emergent histogram 152 and a historical histogram 151 are used to adjust the historical histogram 151 to make the two consistent.

This also has the effect that recent network activity can be compared both with the historical histogram 151 and with the emergent histogram 152. Should recent network activity differ significantly from the historical histogram 151, or from the emergent histogram 152, this might indicate relatively unusual network activity.

Accordingly, the network monitoring device 100 compares recent network activity with the historical histogram 151, and with the emergent histogram 152, to determine whether that recent network activity is relatively unusual.

To make this comparison, the network monitoring device 100 examines recent network activity and determines where in the historical histogram 151 that recent network activity would fall. If the recent network activity falls within the p.d.f. described by the historical histogram 151, the network monitoring device 100 determines that the recent network activity is expected activity, i.e., normal, with respect to the historical histogram 151. If the recent network activity does not fall within the p.d.f. described by the historical histogram 151, network monitoring device 100 determines that the recent network activity is unexpected activity, i.e., not normal, with respect to the historical histogram 151.

For a first example, the historical histogram 151 might indicate that substantially all network activity between a particular source address $S_0$ and a particular destination address $D_1$ falls between $10^3$ bits per second and $10^5$ bits per second, i.e., historical histogram 151 buckets 153 for that source-destination pair are substantially empty outside that range. In such cases, if recent network activity shows an observable value for bits per second larger than the maximum for that range, or smaller than the minimum for that range, the network monitoring device 100 can determine that recent network activity to be not normal. This has the effect that recent network activity can be detected as not normal in either case when that recent network activity is too large or too small to be regarded as normal.

For a second example, the historical histogram 151 might indicate that substantially all network activity between a particular source address $S_0$ and a particular destination address $D_1$ falls within a selected set of buckets 153. One such case might be that historical histogram 151 buckets 153 for that source-destination pair indicate either relatively high-volume traffic (i.e., the historical histogram 151 buckets 153 for, say, more than $10^6$ bits per second show substantial historical network activity) or relatively low-volume traffic (i.e., the historical histogram 151 buckets 153 for, say, less than $10^3$ bits per second show substantial historical network activity), but no substantial network activity in the middle ranges. In such cases, if recent network activity shows an observable value for bits per second other than those ranges shown as likely by the historical histogram 151, the network monitoring device 100 can determine that recent network activity to be not normal. This has the effect that recent network activity can be detected as not normal in either case when that recent network activity is neither too large nor too small to be regarded as normal, but is within a range too unlikely to be regarded as normal.

For a third example, the emergent histogram 152 might differ significantly from the historical histogram 151, e.g., for network activity between a particular source address $S_0$ and a particular destination address $D_1$. In such cases, the network monitoring device 100 can determine that emergent network activity, being more rapidly responsive to recent network activity than historical network activity is responsive to recent network activity, demonstrates that recent network activity is on its way out of the realm determined by the historical histogram 151 to be normal. This has the effect that recent network activity can be detected as not normal even if it is strictly within the realm determined by the historical histogram 151 to be normal, but is trending significantly toward parameters the historical histogram 151 would show to be not normal.

While this description includes embodiments in which the network monitoring system 100 compares recent network activity with the historical histogram 151, in the context of the invention, there is no particular reason that the network monitoring system 100 or the invention should be so limited. For example, the network monitoring system 100 might alternatively operate by comparing recent network activity with the emergent histogram 152, with a combination or conjunction of the historical histogram 151 and the emergent histogram 152, with a separate histogram constructed for the purpose of detecting network activity that is not normal, or using other information suitable for the operations described herein.

SECOND ASPECT

A network monitoring system 100 includes elements as shown in the FIG. 1, including at least: a flow processing engine 110 (coupled to a communication network), a network information buffer 120, a monitoring engine 130, a virtual bus 140, and a database server 150.

The communication network might include any form of communication pathway, such as, a broadcast or narrowcast network, a bus or crossbar switch or other substantially internal communications path in a computing device, a LAN or WAN, a set of external devices disposed for cluster computing or other distributed computing, an enterprise network or internet or intranet, or otherwise.

The flow processing engine 110 includes an input port 111, coupled to the communication network, capable of receiving information from the network regarding communication flows within that network. Such information regarding communication flows might be received from one or more network routers or other traffic reporting devices, as further described in the incorporated disclosures. While this description includes embodiments in which the flow processing engine 110 receives information regarding communication flows, in the context of the invention, there is no particular requirement to so limit the flow processing engine 110 or the invention. For example, the network monitoring system 100 might alternatively operate using information regarding actual network packet traffic, or other information suitable for the operations described herein.

The network information buffer 120 is coupled to an output of the flow processing engine 110, and is capable of receiving network information relating to activity of the communication network. In one embodiment, that network information includes a set of virtual packets, as further described in the incorporated disclosures. While this description includes embodiments in which the network information buffer 120 receives a set of virtual packets, in the context of the invention, there is no particular requirement to so limit the network information buffer 120 or the invention. For example, the network monitoring system 100 might alternatively operate using other information suitable for the operations described herein.

The monitoring engine 130 reads information from the network information buffer 120 and determines substantially instantaneous values for observable values of network parameters.

In one embodiment, these observable values include a bit rate (expressed in bits per second, or an equivalent thereof), a packet rate (expressed in packets per second, or an equivalent thereof), a communication density (expressed as number of concurrent communication partners, or an equivalent thereof), and a communication burstiness (expressed as a change in bit rate, or an equivalent thereof). While this description includes embodiments with regard to these particular observable parameters, in the context of the invention, there is no particular requirement to so limit the monitoring engine 130 or the invention. For example, the network monitoring system 100 might alternatively operate using a first or second derivative of any of these parameters, or other information suitable for the operations described herein.

The virtual bus 140 provides for communication among elements of the network monitoring system 100, such as elements shown in the FIG. 1, including at least: the monitoring engine 130 and the database server 150. Such communication might be conducted using a set of subscription channels, as further described in the incorporated disclosures. While this description includes embodiments in which communication uses subscription channels, in the context of the invention, there is no particular requirement to so limit the virtual bus 140 or the invention. For example, the network monitoring system 100 might alternatively operate using a blackboard communication system, interprocess communication, or other techniques suitable for the operations described herein.

The database server 150 maintains a database of information for use by elements of the network monitoring system 100.

The database server 150 includes elements as shown in the FIG. 1, including at least: a set of substantially instantaneous values for observable values of network parameters. In one embodiment, these observable values include at least:

- a bit rate (measured in bits per second)—indicating a measure of bits sent or received, either between a particular sender $S_0$ and a particular destination $D_0$, or globally by a particular node $N_0$ in the communication network, that node $N_0$ acting either as a sender or a destination for communication;
- a packet rate (measured in packets per second)—indicating a measure of packets sent or received, either between a particular sender $S_0$ and a particular destination $D_0$, or globally by a particular node $N_0$ in the communication network, that node $N_0$ acting either as a sender or a destination for communication;
- a connection density (measured in number of communication partners)—indicating a measure, globally for each particular node $N_0$ in the communication network, of the number of other nodes $N_i$ in the communication network with which that particular node $N_0$ has exchanged information, that node $N_0$ acting either as a sender or a destination for communication;
- a burstiness rate (measured in bits per second per second)—indicating a rate of change in bit rate, either between a particular sender $S_0$ and a particular destination $D_0$, or globally by a particular node $N_0$ in the communication network, that node $N_0$ acting either as a sender or a destination for communication.

In one embodiment, these observable values also include combinations of observable values, e.g., a particular bit rate seen in combination with a particular connection density. As, in one embodiment, there are at least four types of observable values, this has the effect that there are at least six types of combinations of two observable values and at least four types of combinations of three observable values:

- (bit rate)×(packet rate)
- (bit rate)×(connection density)
- (bit rate)×(burstiness rate)
- (packet rate)×(connection density)
- (packet rate)×(burstiness rate)
- (connection density)×(burstiness rate)
- (bit rate)×(packet rate)×(connection density)
- (bit rate)×(packet rate)×(burstiness rate)
- (bit rate)×(connection density)×(burstiness rate)
- (packet rate)×(connection density)×(burstiness rate)
- (bit rate)×(packet rate)×(connection density)×(burstiness rate)

The database server 150 maintains an historical histogram 151, responsive to a long-term view of network activity, and an emergent histogram 152, responsive to a short-term view of network activity. Each of the historical histograms 151 and the emergent histograms 152 include a set of buckets 153, each representing a count of the number of time that observable value has been seen to occur in the course of network activity.

The database server 150 maintains those historical histograms 151 and those emergent histograms 152 only for each observable value for which the network monitoring system 100 determines that there is sufficient information for those historical histograms 151 and emergent histograms 152 to be meaningful. This has the effect that if there is substantially no traffic between a particular sender $S_0$ and a particular destination $D_0$, the network monitoring system 100 would determine that maintaining historical information and emergent information for communication between that particular sender $S_0$ and that particular destination $D_0$ would not have substantial value.

Accordingly, the database server 150 maintains those historical histograms 151 and those emergent histograms 152 for those (sender $S_0$, destination $D_0$) pairs for which there is any substantial bit rate, packet rate, or burstiness value, for those nodes $N_0$ for which there is any substantial global bit rate, global packet rate, or global burstiness value, for those nodes $N_0$ for which there is any substantial global connection density value, and for those (sender $S_0$, destination $D_0$) pairs and for those nodes $N_0$ for which there is any substantial value for any of the combinations of multiple observable values.

The network monitoring system 100, from time to time, determines those observable values and compares them against thresholds (selected for each type of observable value or type of multiple observable values), with the effect of determining if there is any substantial traffic to justify maintaining those historical histograms 151 and emergent histograms 152. It is expected that the number of such (sender $S_0$, destination $D_0$) pairs and the number of such nodes $N_0$ for which maintaining network activity information is justified would be relatively small compared to the number of possible such (sender $S_0$, destination $D_0$) pairs and the number of possible such nodes $N_0$.

THIRD ASPECT

A network monitoring system 100 includes elements as shown in the FIG. 2, including at least: a flow processing engine 110 (coupled to a communication network), a network information buffer 120, a monitoring engine 130, a virtual bus 140, and a database server 150.

The communication network might include any form of communication pathway, such as, a broadcast or narrowcast network, a bus or crossbar switch or other substantially internal communications path in a computing device, a LAN or WAN, a set of external devices disposed for cluster computing or other distributed computing, an enterprise network or internet or intranet, or otherwise.

The flow processing engine 110 includes an input port 111, coupled to the communication network, capable of receiving information from the network regarding communication flows within that network. Such information regarding communication flows might be received from one or more network routers or other traffic reporting devices, as further described in the incorporated disclosures. While this description includes embodiments in which the flow processing engine 110 receives information regarding communication flows, in the context of the invention, there is no particular requirement to so limit the flow processing engine 110 or the invention. For example, the network monitoring system 100 might alternatively operate using information regarding actual network packet traffic, or other information suitable for the operations described herein.

The network information buffer 120 is coupled to an output of the flow processing engine 110, and is capable of receiving network information relating to activity of the communication network. In one embodiment, that network information includes a set of virtual packets, as further described in the incorporated disclosures. While this description includes embodiments in which the network information buffer 120 receives a set of virtual packets, in the context of the invention, there is no particular requirement to so limit the network information buffer 120 or the invention. For example, the network monitoring system 100 might alternatively operate using other information suitable for the operations described herein.

The monitoring engine 130 reads information from the network information buffer 120 and determines substantially instantaneous values for observable values of network parameters.

In one embodiment, these observable values include a bit rate (expressed in bits per second, or an equivalent thereof), a packet rate (expressed in packets per second, or an equivalent thereof), a communication density (expressed as number of concurrent communication partners, or an equivalent thereof), and a communication burstiness (expressed as a change in bit rate, or an equivalent thereof). While this description includes embodiments with regard to these particular observable parameters, in the context of the invention, there is no particular requirement to so limit the monitoring engine 130 or the invention. For example, the network monitoring system 100 might alternatively operate using a first or second derivative of any of these parameters, or other information suitable for the operations described herein.

The virtual bus 140 provides for communication among elements of the network monitoring system 100, such as elements shown in the FIG. 2, including at least: the monitoring engine 130 and the database server 150. Such communication might be conducted using a set of subscription channels, as further described in the incorporated disclosures. While this description includes embodiments in which communication uses subscription channels, in the context of the invention, there is no particular requirement to so limit the virtual bus 140 or the invention. For example, the network monitoring system 100 might alternatively operate using a blackboard communication system, interprocess communication, or other techniques suitable for the operations described herein.

The database server 150 maintains a database of information for use by elements of the network monitoring system 100. That database of information includes data structures for maintaining information regarding historical activity of the communication network and emergent activity of the communication network. Those data structures include observable values for multiple profile dimensions, including at least: source address, destination address, application, location, and time. Those data structures also include observable values for combinations of more than one of those multiple profile dimensions, including, e.g., (source address)×(application), and the like.

In one embodiment, it is expected that only a relatively sparse set of combinations of more than one of those multiple profile dimensions would have meaningful information associated therewith. The network monitoring system 100 maintains those data structures only for those combinations of more than one of those multiple profile dimensions for which maintaining that information would be substantially meaningful, in response to a selected threshold value for network activity in any one of those multiple profile dimensions or any one combination of more than one of those multiple profile dimensions.

Alternative Embodiments

After reading this application, those skilled in the art will recognize that the invention has wide applicability, and is not limited to the embodiments described herein.

TECHNICAL APPENDIX

This application has a technical appendix including the following documents:

Unpublished document titled "Affinity-based Profiling for Symptom Detection", naming contributors Derek SANDERS, Rangaswamy JAGANNATHAN, Rosanna LEE, and Kishor KAKATKAR.

Unpublished document titled "Affinity-based Profiling for Symptom Detection (Revised)", naming contributors Derek SANDERS, Rangaswamy JAGANNATHAN, Rosanna LEE, Kishor KAKATKAR, and Jing LIU.

Unpublished document titled "Determining Periodicity in Crosspoint Behavior Using Spectral Analysis", naming contributors Derek SANDERS, Rangaswamy JAGANNATHAN, Rosanna LEE, Kishor KAKATKAR, and Xiaohong PAN.

Unpublished document titled "Determining Periodicity in Crosspoint Behavior Using Spectral Analysis (Revised)", naming contributors Derek SANDERS, Jing LIU, Rangaswamy JAGANNATHAN, Rosanna LEE, Kishor KAKATKAR, and Xiaohong PAN.

Unpublished document titled "Multidimensional Profiling for Probabilistic Symptom Detection", naming contributors Derek SANDERS, Rangaswamy JAGANNATHAN, Rosanna LEE, Kishor KAKATKAR, and Xiaohong PAN.

Unpublished document titled "Multidimensional Profiling for Probabilistic Symptom Detection (Revised)", naming contributors Derek SANDERS, Rangaswamy JAGANNATHAN, Rosanna LEE, Kishor KAKATKAR, Xiaohong PAN, and Jing LIU.

Unpublished document titled "Scalable Performance Using a Distributed Xangati Solution", naming contributors Rangaswamy JAGANNATHAN, Rosanna K. LEE, Derek SANDERS, Kishor KAKATKAR, and Xiaohong PAN.

Unpublished document titled "Techniques to Improve Performance and Reduce Memory Footprint of a Single-Appliance Xangati Solution", naming contributors Rosanna K. LEE, Xiaohong PAN, Rangaswamy JAGANNATHAN, Derek SANDERS, and Kishor KAKATKAR.

Each of these documents is hereby incorporated by reference as if fully set forth herein.

The invention claimed is:

1. A network monitoring system comprising
a flow processing engine coupled to a communication network and capable of receiving network information from the communication network regarding communication flows within the communication network;
a network information buffer coupled to the flow processing engine;
a monitoring engine coupled to the network information buffer and capable of receiving at least some of the network information relating to activity of the communication network; and
a database server that maintains a database of information for use by the monitoring engine, the database of information including at least a historical histogram of multidimensional crosspoints of a plurality of parameters regarding historical activity of the communication network, and an emergent histogram of multidimensional crosspoints of a plurality of parameters regarding emergent activity of the communication network;
wherein the database of information is used to detect abnormal network activity;
wherein at least one of the historical histogram or the emergent histogram includes a set of buckets disposed in a sequential order related to each of observable values; and wherein each set of buckets includes one bucket associated with a range of values for each of a plurality of dimensions associated with the multidimensional crosspoints.

2. The network monitoring system as in claim 1 wherein the monitoring engine determines the multidimensional crosspoints in response to the observable values of a plurality of parameters relating to network activity.

3. The network monitoring system as in claim 2, wherein at least one of the historical histogram, the emergent histogram, represents a probability density function associated with the multidimensional crosspoints.

4. The network monitoring system as in claim 2, wherein the multidimensional crosspoints include one or more of: application×endpoint, application×location, application×time period, endpoint×location, endpoint×time period, location×time period, application×endpoint×location, application×endpoint×time period, application×location×time period, endpoint×location×time period.

5. The network monitoring system as in claim 2, wherein
the system determines a recent activity for at least one of the multidimensional crosspoints;
the system compares the recent activity with one or more of: historical histogram, the emergent histogram.

6. The network monitoring system as in claim 2, wherein
the system periodically alters the historical histogram in response to the emergent histogram;
this historical histogram is responsive to changes in behavior of the system.

7. The network monitoring system as in claim 1 wherein the observable values include one or more of: a bit rate, a packet rate, a communication density, or a communication burstiness.

8. The network monitoring system as in claim 1 wherein the flow processing engine further comprises an input port capable of receiving information regarding communication flows within the communication network.

9. The network monitoring system as in claim 1 wherein the monitoring engine operates using information regarding actual network packet traffic.

10. The network monitoring system as in claim 1 wherein the monitoring engine operates using information other than regarding actual network packet traffic of the communication network.

11. The network monitoring system as in claim 1 wherein the network information comprises virtual packets.

12. A network monitoring method comprising:
using a flow processing engine coupled to a communication network to receive network information from the communication network regarding communication flows within the communication network;
coupling a network information buffer to the flow processing engine;
using a monitoring engine coupled to the network information buffer to receive at least some of the network information relating to activity of the communication network; and
maintaining a database of information for use by the monitoring engine, the database of information including at least a historical histogram of multidimensional crosspoints of a plurality of parameters regarding historical activity of the communication network, and an emergent histogram of multidimensional crosspoints of a plurality of parameters regarding emergent activity of the communication network;
wherein the database of information is used to detect abnormal network activity wherein at least one of the historical histogram or the emergent histogram includes a set of buckets disposed in a sequential order related to each of observable values; and
wherein each set of buckets includes one bucket associated with a range of values for each of a plurality of dimensions associated with the multidimensional crosspoints.

13. The network monitoring method as in claim 12 wherein the monitoring engine determines the multidimensional crosspoints in response to the observable values of a plurality of parameters relating to network activity.

14. The network monitoring method as in claim 13 wherein at least one of the historical histogram, the emergent histogram, represents a probability density function associated with the multidimensional crosspoints.

15. The network monitoring method as in claim 13, wherein the multidimensional crosspoints include one or more of: an application×endpoint, an application×location, an application×time period, an endpoint×location, an endpoint×time period, a location×time period, an application×endpoint×location, an application×endpoint×time period, an application×location×time period, or an endpoint×location×time period.

16. The network monitoring method as in claim 13 wherein the flow processing engine further comprises an input port capable of receiving information regarding communication flows within the communication network.

17. The network monitoring method as in claim 12 wherein the monitoring engine operates using information regarding actual network packet traffic.

18. The network monitoring method as in claim 12 wherein the monitoring engine operates using information other than regarding actual network packet traffic of the communication network.

19. The network monitoring method as in claim 12 wherein the network information comprises virtual packets.

20. A network monitoring method as in claim 12, wherein the observable values include one or more of: a bit rate, a packet rate, a communication density, or a communication burstiness.

* * * * *